July 26, 1932.  A. F. JENKINS  1,869,215
OXY-ACETYLENE TORCH
Filed Feb. 1, 1929
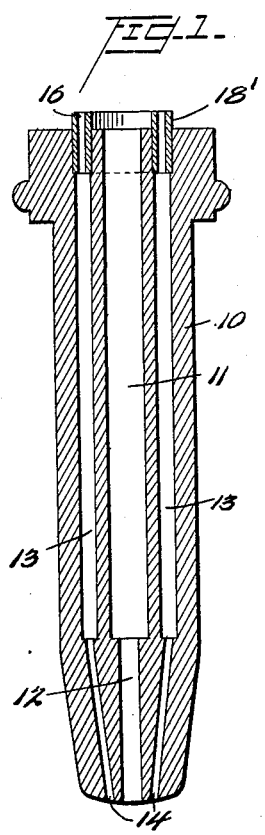
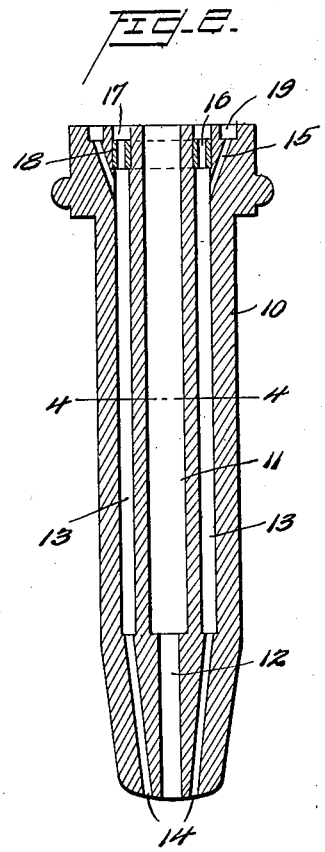
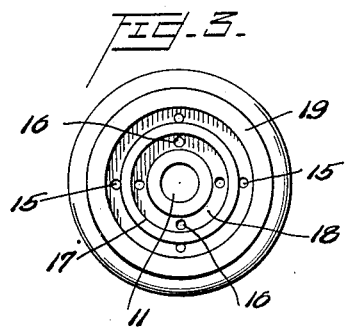
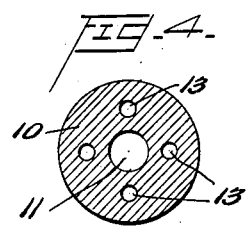
Inventor
Alexander F. Jenkins
By Watson, Coit, Morse & Grindle
Attorney Patented July 26, 1932

1,869,215

UNITED STATES PATENT OFFICE

ALEXANDER F. JENKINS, OF BALTIMORE, MARYLAND

OXY-ACETYLENE TORCH

Application filed February 1, 1929. Serial No. 336,810.

The present invention relates to improvements in cutting and welding tips for oxy-acetylene or other torches using mixed gases for heating metal to be cut or welded. The invention will be illustrated and described in connection with a cutting tip although by omitting the oxygen passage, the same tip may be used for heating or welding purposes.

The object of the invention is to produce a tip having one or more relatively large bores therethrough, each provided with a restricted outlet and with a restricted inlet passage, the gases to be mixed in said bore or bores. The object of the invention is accomplished by boring through the body of the tip with a relatively large drill, boring with a finer drill from the outlet end of the tip, and partially closing the rear end of the large bore or bores by means of a ring inserted in the base through which perforations are drilled connecting with the bores.

The invention will be described more in detail in connection with the accompanying drawing, in which:

Figure 1 is a longitudinal section through a tip as it appears in the process of manufacture;

Figure 2 is a similar section through a completed tip;

Figure 3 is a plan view of Figure 2; and

Figure 4 is a section on the line 4—4 of Figure 2.

Referring to the drawing, 10 indicates a cutting tip of the usual external form provided with a central passage 11 for cutting oxygen having a somewhat reduced outlet 12. Surrounding the central bore 11 are a series of longitudinal bores 13 which are provided with reduced outlets 14. The bores 13 are conveniently drilled from the rear or base of the tip, and each is supplied with fuel and oxidizing gases, such as acetylene and oxygen, through an inclined passage 15 and an axial passage 16. Preferably, the axial passage admits oxygen under pressure which acts to draw in the fuel gas in the manner of an injector, the gases mixing in the enlarged bore 13.

As a convenient means of creating the reduced inlet passages 16, a deep annular groove 17 is cut in the base of the tip and a tightly fitting ring 18 forced into the groove. The passages 16 are bored in the ring either before or after its insertion in the tip.

In the manufacture of the torch tip, I preferably insert a ring 18' of considerable length, as shown in Figure 1, with the passages 16 bored in it. The ring is then turned down until the groove 17 is formed in the base of the tip as shown in Figure 2. A like groove 19 is also formed in the base of the tip to receive the fuel gases, and the inclined passages 15 are bored from the groove 19 to the enlarged bores 13. The perforations 15 and 16 may vary in tips for different purposes, but they are always much smaller than the bores 13 whereby the gases may mix thoroughly in passing to the outlets 14. It will be evident that by stopping off the central oxygen passage 11, 12, the tip described may be used for heating purposes only, or for welding.

Having thus described the invention, what is claimed as new and desired to be secured by Letters Patent is:

1. A tip for a torch of the character described having a plurality of bores of relatively large diameter with restricted outlets, the base of the tip having seated therein a ring provided with restricted perforations communicating with the rear of said bores and having additional restricted perforations communicating with said bores below the ring.

2. A tip for a cutting torch, having a central oxygen passage and a plurality of parallel longitudinal bores therethrough, each bore having a restricted outlet, the base of the tip having seated therein a ring having a plurality of perforations of less diameter than the diameter of said bores and respectively communicating with said bores, and additional inclined gas passages leading into said bores below said ring whereby the bores serve as mixing chambers.

3. A torch tip of the class described comprising a body portion having a seating surface at one end and a plurality of substantially parallel ducts in the body thereof, an annular groove in the end of the body intersecting the seating surface, the said ducts intersecting the bottom of said groove, and an annular sleeve seated and frictionally retained in said groove, said sleeve having a plurality of ducts extending therethrough, which ducts register respectively with the ducts in the body but are of less cross-sectional area, the annular outer end surface of the sleeve lying below the seating surface of the tip and the sleeve providing a single element for effecting the restriction of all of the aforementioned ducts.

In testimony whereof I hereunto affix my signature.

ALEXANDER F. JENKINS.